US007577941B2

(12) United States Patent
Gallagher et al.

(10) Patent No.: US 7,577,941 B2
(45) Date of Patent: Aug. 18, 2009

(54) SYSTEM AND METHOD FOR IDENTIFYING POTENTIAL SECURITY RISKS IN CONTROLS

(75) Inventors: Thomas P. Gallagher, Redmond, WA (US); Lawrence G. Landauer, Woodinville, WA (US); Imran Akhtar, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 484 days.

(21) Appl. No.: 10/155,354

(22) Filed: May 22, 2002

(65) Prior Publication Data

US 2004/0025043 A1 Feb. 5, 2004

(51) Int. Cl.
G06F 9/44 (2006.01)
G06F 12/16 (2006.01)
(52) U.S. Cl. .................. 717/126; 717/102; 717/121; 726/24
(58) Field of Classification Search .............. 717/178, 717/126, 171; 726/24; 710/36
See application file for complete search history.

(56) References Cited

U.S. PATENT DOCUMENTS

| 6,092,194 | A  | * | 7/2000  | Touboul       | 726/24  |
|-----------|----|---|---------|---------------|---------|
| 6,151,643 | A  | * | 11/2000 | Cheng et al.  | 710/36  |
| 6,298,478 | B1 | * | 10/2001 | Nally et al.  | 717/170 |
| 6,314,565 | B1 | * | 11/2001 | Kenner et al. | 717/171 |
| 6,370,569 | B1 | * | 4/2002  | Austin        | 709/217 |
| 6,473,800 | B1 | * | 10/2002 | Jerger et al. | 709/226 |
| 6,662,217 | B1 | * | 12/2003 | Godfrey et al.| 709/219 |
| 6,691,176 | B1 | * | 2/2004  | Narin et al.  | 719/318 |
| 6,698,013 | B1 | * | 2/2004  | Bertero et al.| 717/127 |
| 6,718,549 | B1 | * | 4/2004  | Narin et al.  | 717/178 |
| 6,802,061 | B1 | * | 10/2004 | Parthasarathy et al. | 717/173 |
| 2002/0107809 | A1 | * | 8/2002 | Biddle et al. | 705/59 |

OTHER PUBLICATIONS

"A Comparison between Java and ActiveX Security", D. Hopwood, Oct. 1997, pp. 1-9. Online retrieved at <http://www.users.zetnet.co.uk/hopwood/papers/compsec97.html>.*
"Data Mining Methods for Detection of New Malicious Executables", Eskin et al., May 2001, pp. 38-49. Online retrieved at <http://ieeexplore.ieee.org/stamp/number=924286&isnumber=19992>.*
"A Dynamic Web Agent for Verifying the Security and Integrity of a Web Site's Contents", Sedaghat et al., Jul. 2001, pp. 330-337. Online retrieved at <http://ieeexplore.ieee.org/stamp/number=942281&isnumber=20395>.*
Slayden, April et al., "A Web Tool For Generic Design", The Proceedings of the 14th International Conference on Computer Applications in Industry and Engineering, Nov. 27-29, 2001, pp. 85-88.
Sami, Mohammed et al., "Test Framework for Interfaces: A Pragmatic Approach", Proceedings of the 15th International Conference and Exposition on Testing Computer Software, Jun. 8-21, 1998, pp. 43-46.

* cited by examiner

*Primary Examiner*—Tuan Q Dam
*Assistant Examiner*—Thuy Dao
(74) *Attorney, Agent, or Firm*—Merchant & Gould, P.C.

(57) ABSTRACT

Controls of interest are indentified by determining which installed software objects associated with the application of interest exhibit certain characteristics, such as being publicly creatable, being designated as safe, and providing a security-related interface. Once the controls of interest are identified from the installed software objects, information associated with each control is obtained and stored. Each time the software program of interest is modified and re-installed, the information is updated to reflect the modifications. Additional information is also stored with the information. The information and the additional information may be provided to a browser for display and may be modified by a user to describe a present state associated with the control of interest (i.e., tested, untested).

17 Claims, 14 Drawing Sheets

File Names

300 — 
```
AA.DLL
AAA.DLL
AAA.OCX
ABC.DLL
ADAA.DLL
ADASDE.R
AMBROSET.OCX
COMDLG32.OCX
COOL.DLL
DSF.DDD
```

302 — More Info

*Fig. 3*

SYSTEM AND METHOD FOR IDENTIFYING POTENTIAL SECURITY RISKS IN CONTROLS

BACKGROUND OF THE INVENTION

The Internet and the World Wide Web continue to offer users access to increasingly sophisticated content through Web pages. In the past, Web pages typically contained simple text and some graphics. Thus, the Web pages were very unlikely to cause harm to a user's computer system. Now, Web pages are designed to provide more sophisticated content, that is not natively supported by a browser. The sophisticated content allows the users to interact with Web pages in new and innovative ways. For the purpose of this discussion, this sophisticated content is referred to as active content. In some cases, in order to provide this active content, the Web pages may require additional executable code to run on the system that is viewing the Web page (i.e., the user's system).

One technique for providing active content is through the use of ActiveX controls. However, ActiveX controls are not only found in Web pages, but are also commonly found in packaged software products, freeware and shareware products. Any of these sources of ActiveX controls may eventually cause the ActiveX control to get installed on the user's system, such as when new software products are installed, when downloading content from the Internet, or the like. Once installed, the ActiveX control is available for use by any code that knows of the ActiveX control's existence.

For example, a Web page may include an object tag identifying an ActiveX control. A scripting engine within a browser application will read the object tag and instantiate the ActiveX control and begin processing provided by the ActiveX control. When the ActiveX control is designated as unsafe, the Internet browser application will provide an option to the user explaining that the ActiveX control is unsafe and will ask whether the user wishes to proceed anyway. Thus, the user is provided an opportunity to forego using the active content provided by the unsafe ActiveX control. However, once the ActiveX control is designated as safe, the Internet browser application may proceed to run the ActiveX control without warning.

Therefore, once the ActiveX control is installed on the user's system and designated as safe, anyone that knows of the control's existence or anyone that finds out about the control's existence may cause the user to use the ActiveX control without the user even knowing. This provides an opportunity for someone to purposefully harm a user's system by using an ActiveX control in a malicious manner. This is especially worrisome because the ActiveX control may get installed on the user's system and designated as safe automatically without warning to the user if the user has previously expressed acceptance of digitally signed code by a company associated with the ActiveX control. Thus, there is a huge concern that someone may use one of the numerous ActiveX controls created by a reputable software company in a malicious manner to harm the user's computer. Until the present invention, a mechanism did not exist that would allow software companies to easily identify potential security risks in ActiveX controls designed by them for use in their commercial software products.

SUMMARY OF THE INVENTION

The present invention provides a system and method for tracking and verifying that controls associated with an application of interest do not present a potential security risk. The method includes identifying controls of interest by determining which installed software objects associated with the application of interest exhibit certain characteristics, such as being publicly creatable, being designated as safe, and providing a security-related interface. Once the controls of interest are identified from the installed software objects, information associated with each control is obtained and stored. Each time the software program of interest is modified and re-installed, the information is updated to reflect the modifications. Additional information is also stored with the information. The addition information provides a mechanism for tracking changes and verifying testing of the controls of interest.

In one aspect of the invention, the information and the additional information are provided to a browser for display and are modifiable to describe a present state associated with the control of interest (i.e., tested, untested).

BRIEF DESCRIPTION OF THE DRAWINGS

FIGS. 3-8 are illustrative screen shots of a user interface that may be presented on the user computer using data provided by the Web server shown in FIG. 2, in accordance with one implementation of the invention.

DETAILED DESCRIPTION OF THE PREFERRED EMBODIMENT

Briefly stated, the present invention provides a rich display of information about a control (e.g., ActiveX control) to a client computer in response to a request for information about the control. The rich display includes change information, testing information, and review information that enables a software developer and others the ability to determine whether additional testing or review is necessary to ensure that the control is secure. The rich display also includes general information about the requested control. This general information is extracted from the client computer each time controls are installed after a build of the controls. The general information is sent to a web server that is responsible for storing the general information and for providing the general information and the rich display to user computers. Embodiments of the invention will now be described to facilitate a better understanding of the invention. The described environment pertains to an ActiveX software development environment. However, the invention is not limited to these specific embodiments, but rather is defined only by the scope of the appended claims.

Figure 1:
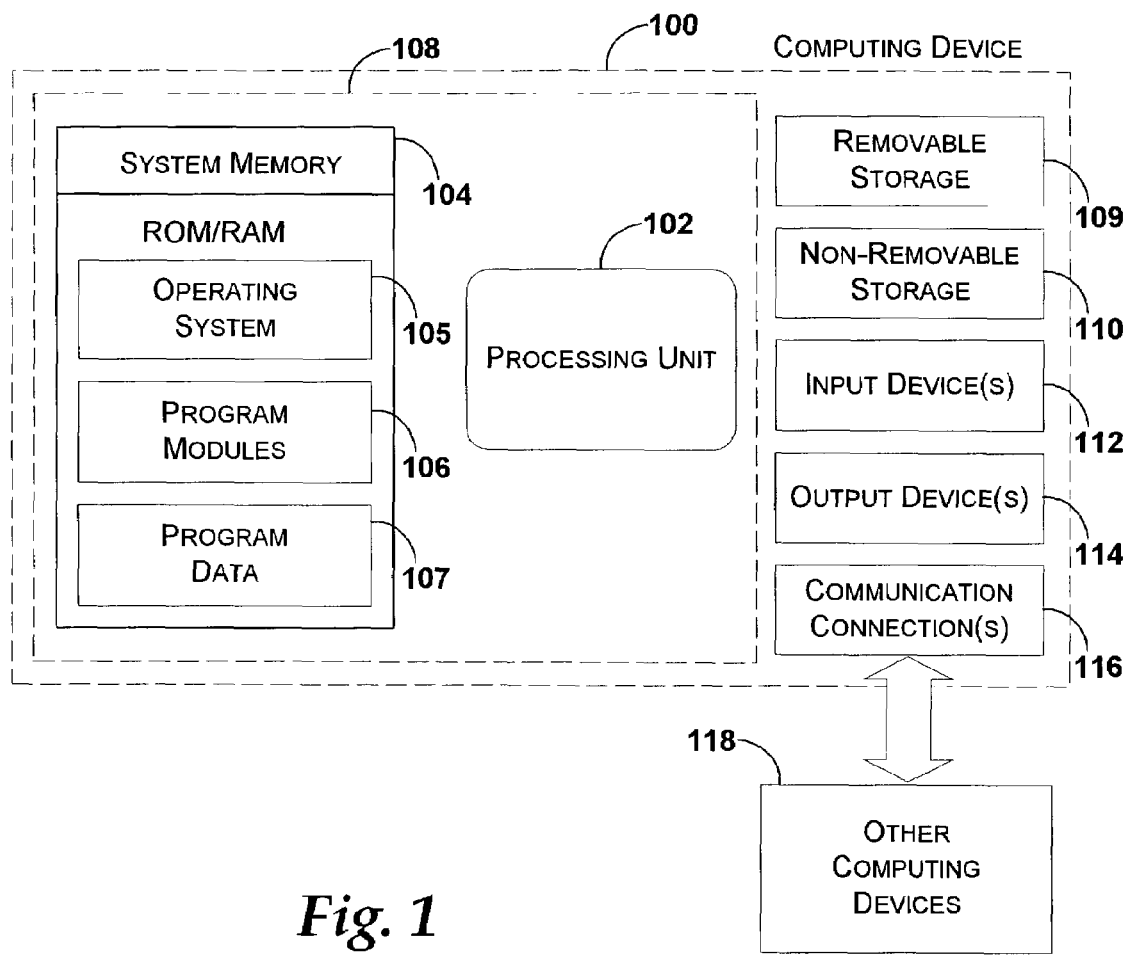
FIG. 1 illustrates an exemplary computing device that may be used in one exemplary embodiment of the present invention.

FIG. 1 illustrates an exemplary computing device that may be used in one exemplary embodiment of the present invention. With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration of computing device 100 is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
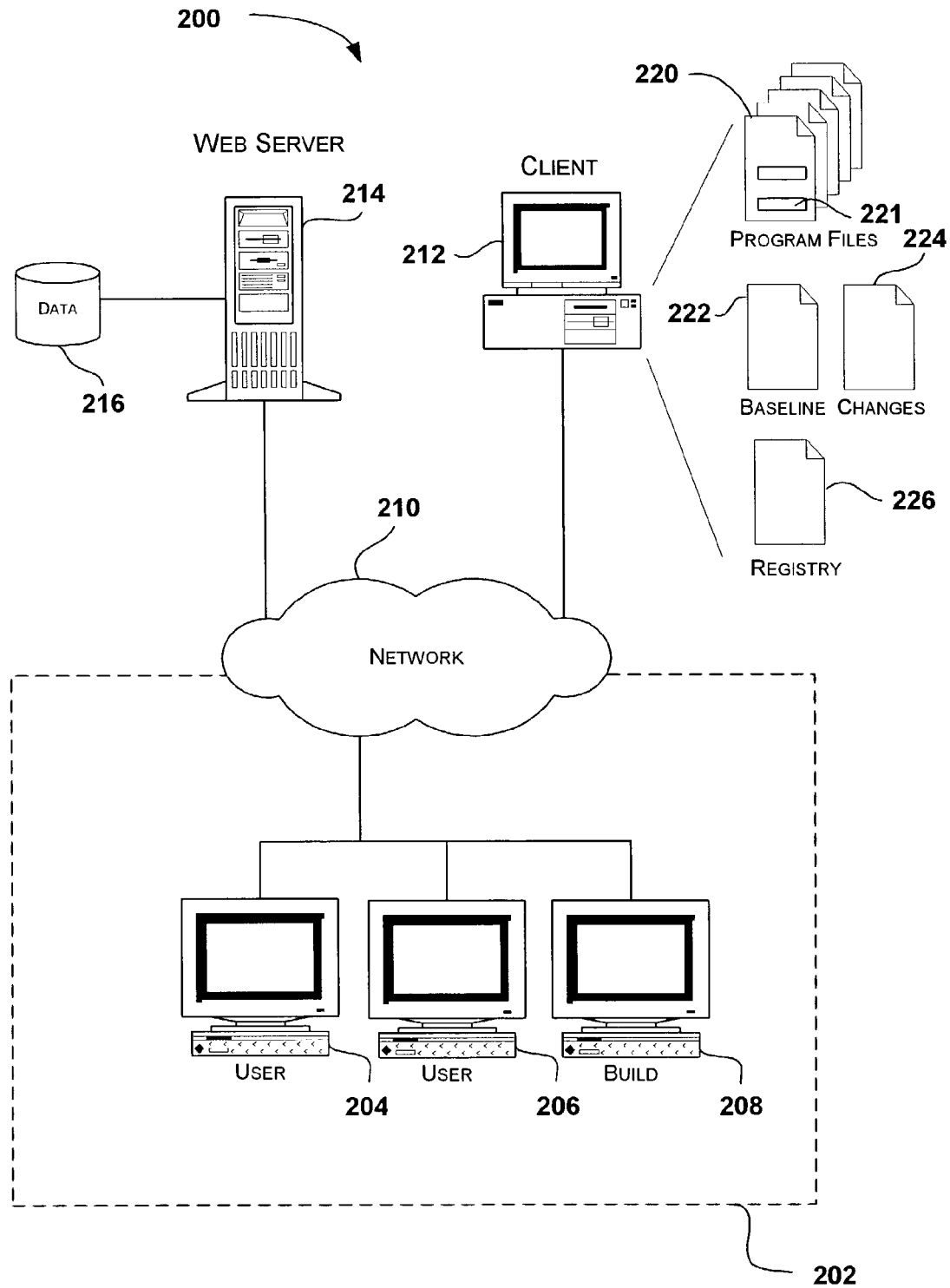
FIG. 2 illustrates an exemplary computing environment in which the present invention may be implemented.

FIG. 2 illustrates an exemplary computing environment in which the present invention may be implemented. The exemplary computing environment is an ActiveX software development environment 200. The ActiveX software development environment 200 includes one or more user computers (e.g., user computers 204-206), one or more build computers (e.g., build computer 208), a client computer 212 and a web server 214 connected over a network 210. In one embodiment, network 210 is an intranet. The build computer 208 is responsible for generating code, such as ActiveX controls, for a particular application. The generated code will undergo many iterations (i.e., builds) and much testing before the application is available as a commercial product.

In this implementation, user computers 204-206, build computer 208, client computer 212, and web server 214 are computing devices such as the one described above in conjunction with FIG. 1. Client computer 212 includes an extraction process (i.e., one of program modules 106 shown in FIG. 1). One of the advantages of the present invention is that developers do not necessarily have to alert testers that their code is an ActiveX control and that their code needs to be tested for security concerns. Rather, in accordance with the present invention, the determination of whether code is an ActiveX control is performed automatically. This determination, described in detail later in conjunction with FIGS. 9-13, is performed by the extraction process on client computer 212. Briefly described, program files (e.g., program file 220) are installed on client computer 212. Program files 220 are built by developers on build computer 208. Some of these program files 220 include ActiveX control code (e.g., ActiveX control 221). Using registry 226, the client computer 212 creates a baseline 222 that identifies all ActiveX controls installed. Then, when additional program files 220 are installed or modified, the client computer 212 creates a change file 224 that identifies new ActiveX controls and modified ActiveX controls. The change file 224 is then submitted to Web server 214 for storing in database 216.

Web server 214 includes a process for handling requests from the client computer 212 to update database 216 with information regarding installed ActiveX controls. In addition, Web server 214 includes a process for handling requests from the user computers 204-206 for information about the installed ActiveX controls. The server process (e.g., one of program modules 106 on Web server 214) is described in detail later in conjunction with FIG. 14. This server process provides another advantage of the present invention, namely, the ability of the software developers and, perhaps, their managers to track changes, ownership, and review in a more convenient and friendly manner. The interface provided for display on the user computers 204-206 is discussed in detail below in conjunction with FIGS. 3-8.

Now, before explaining how the ActiveX controls are identified by the client computer and how information associated with the ActiveX controls is stored in the web server, the rich display of information provided to a user on one of the user computers 204-206 is described. FIGS. 3-8 are illustrative screen shots of a user interface that may be displayed on the user computer using data provided by the Web server shown in FIG. 2, in accordance with one implementation of the invention.

Figure 3:
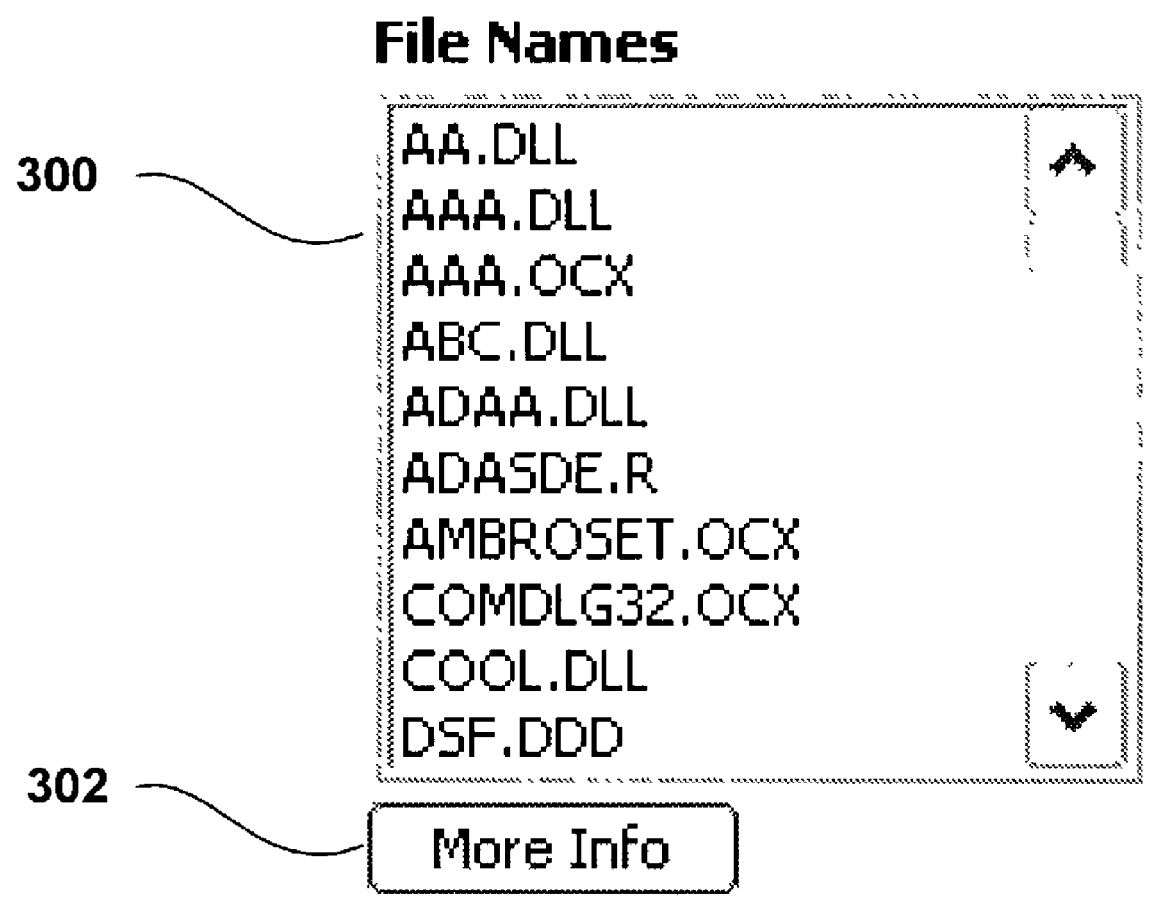

FIG. 3 illustrates a filename box 300 that lists each of the programs' files (i.e., program files 220 shown in FIG. 2) that has at least one control of interest. The filename box 300 may appear in a web browser application on the user computer after a uniform resource locator (URL) is specified. For example, by entering "http://server/activex" in the web browser application, the web server will serve an HTML file that includes a script that manipulates the user-interface on the user computer and results in filename box 300 appearing on the display. Upon selecting more info button 302, the web server will return another HTML file that will provide more details regarding the selected program file.

Figure 4:
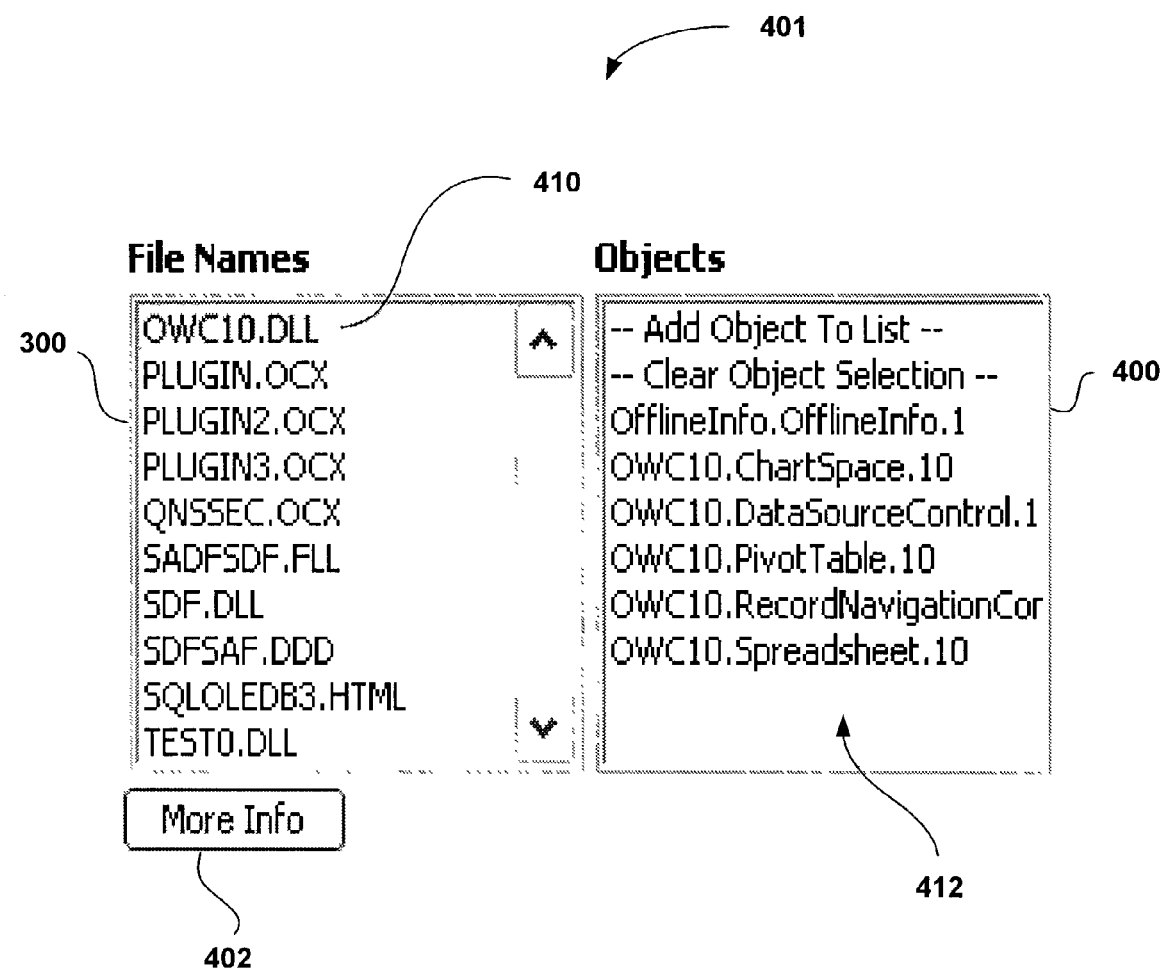

Now, assuming "OWC10.DLL" is displayed in the filename box 300 and is selected, when more information button 302 is selected, illustrative screen shot 401 may be presented to the user as shown in FIG. 4. Screen shot 401 includes the filename box 300 in addition to an object box 400. Object box 400 includes an object list 412 that identifies each object in the selected file (e.g., "OWC10.DLL"). One of the objects in the object list 412 may be selected and more detailed information pertaining to the selected object will appear.

Figure 5:
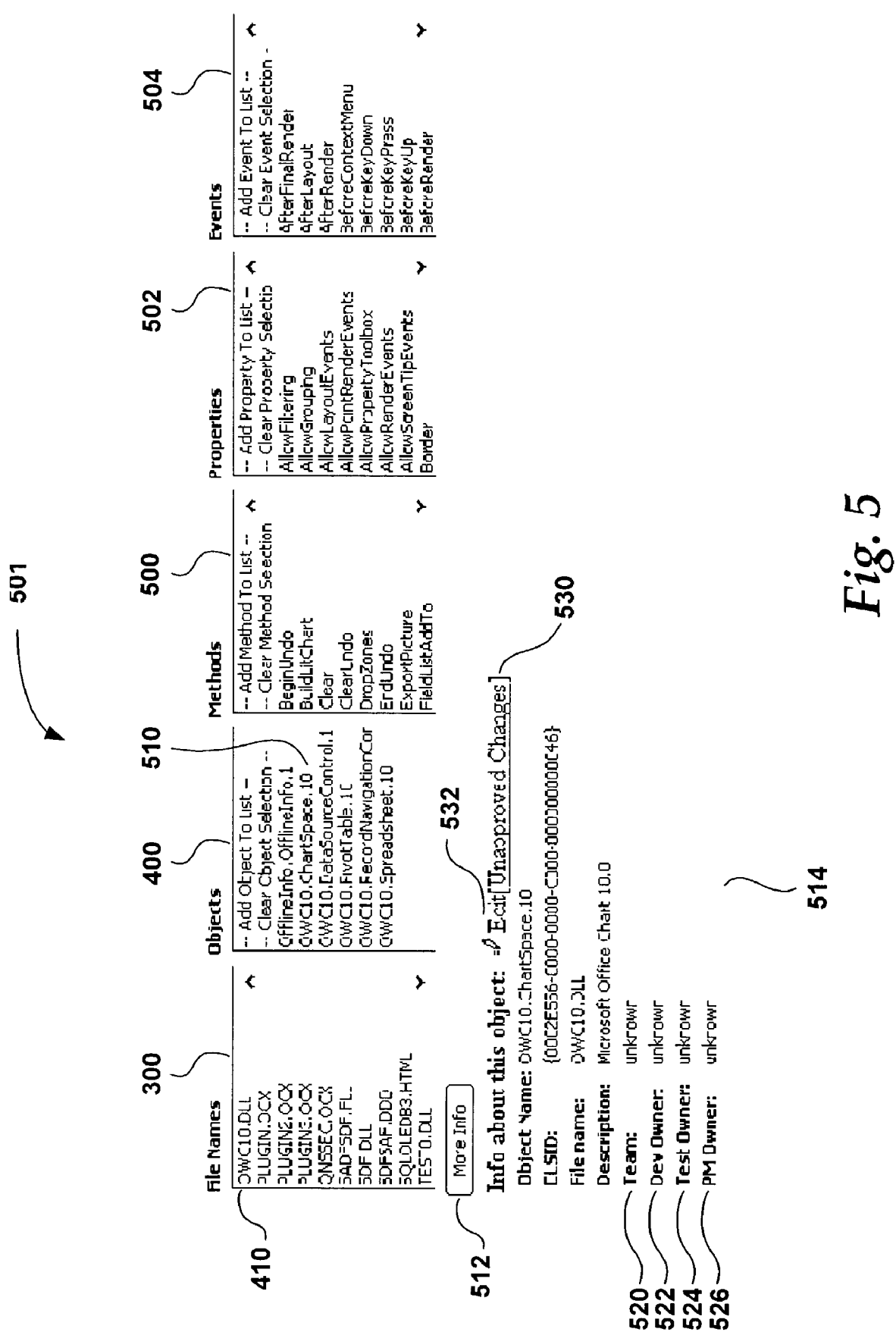

FIG. 5 illustrates a screen shot 501 that includes the filename box 300, the object box 400 in addition to a method box 500, a properties box 502, and an events box 504. Hereinafter, the methods, properties, parameters, and events of any object are collectively referred to as its members. As one can see, the developer can easily navigate to one of the controls as needed. In addition, screen shot 501 may include detailed information 514 regarding the selected object. The detailed information 514 may include object information, such as object name, class identifier, filename, and a description. In addition, in accordance with the present invention, the detailed information may include development information, such as a team 520, a development owner 522, a test owner 524, and a design owner 526. Thus, from screen shot 501, a developer or tester may view and/or approve changes to the object, edit details about the object and examine a specific member in greater detail.

Figure 6:
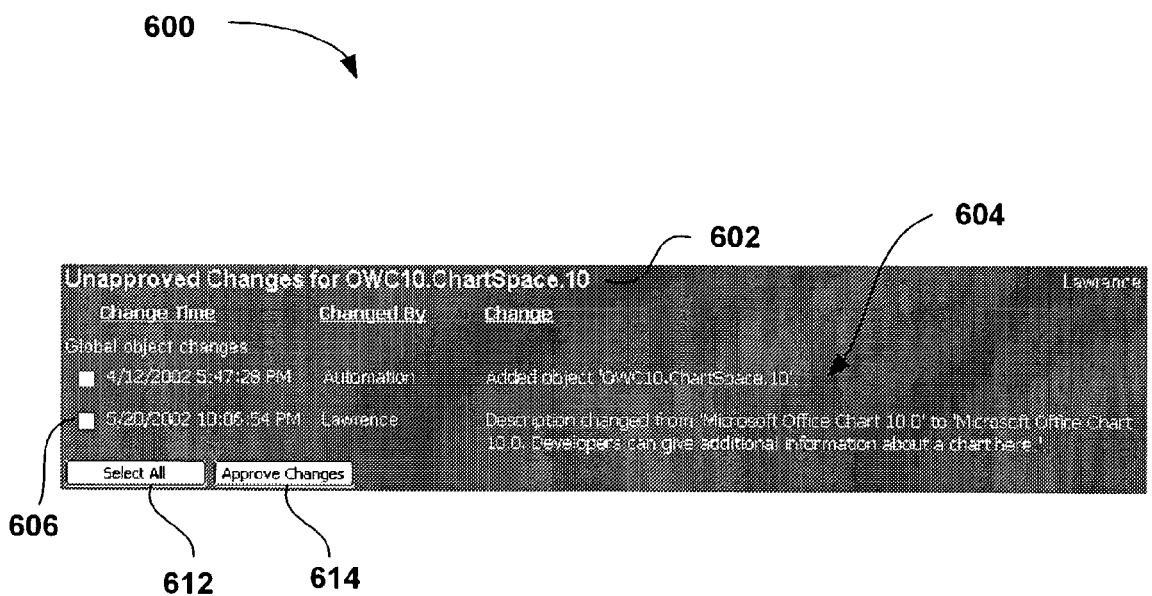

For example, when a developer or tester wishes to view changes, an unapproved change link 530 is selected. FIG. 6 is an exemplary screen shot 600 illustrating the unapproved changes. From this screen shot 600, a user can sign off on specific changes by selecting a corresponding checkbox (e.g., checkbox 606). Alternatively, the user may sign off on all the listed changes by selecting a "Select All" button 612. In either case, once the desired changes have been selected, the user selects an approved change button 614 to effectively sign-off on the changes. The sign-off information will then be transmitted to the web server 214 and maintained for future reference.

Figure 7:
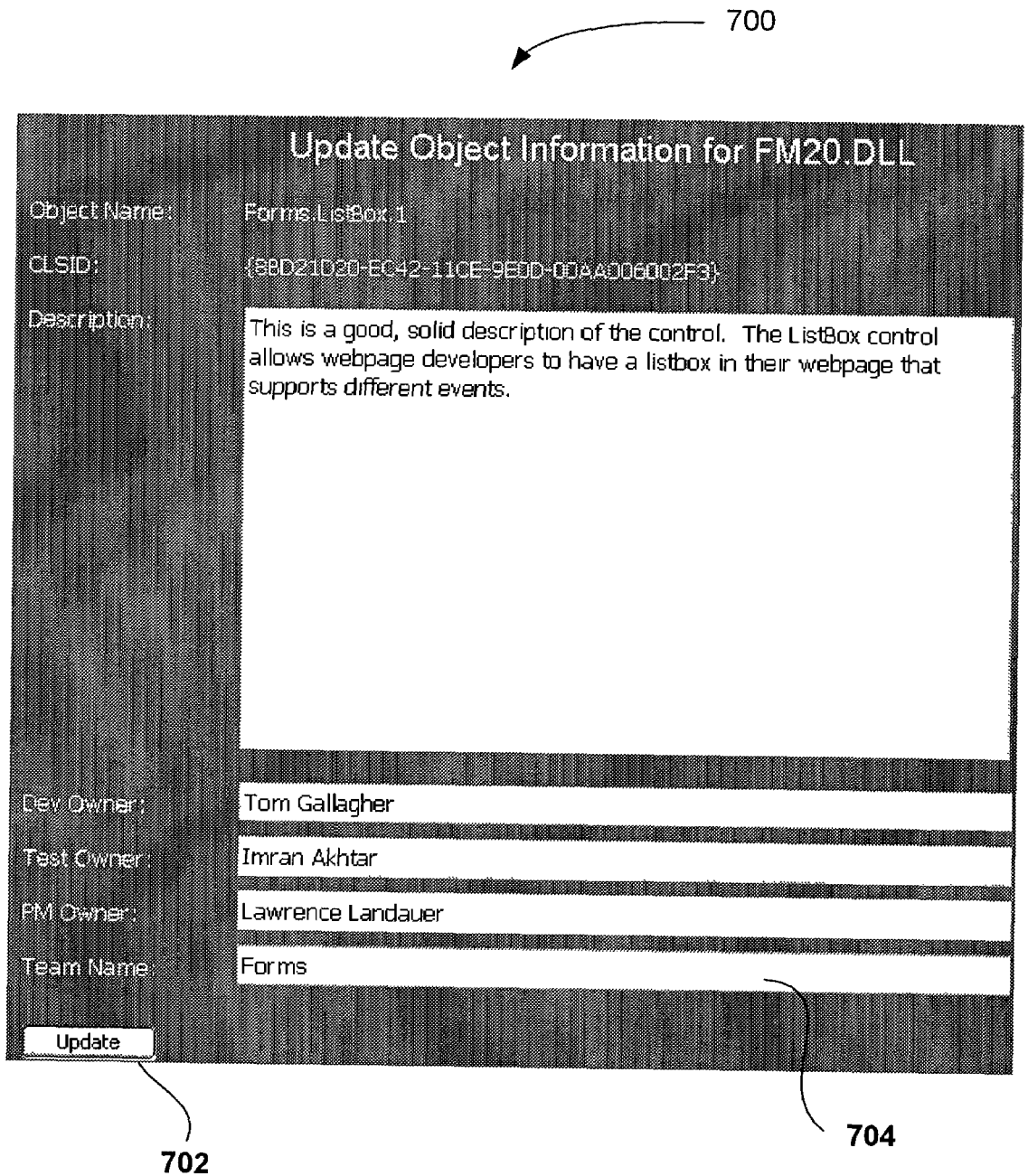

In another example, when a developer wishes to edit details about the object, the user clicks an edit icon 532, shown in FIG. 5. FIG. 7 is an exemplary screen shot illustrating current information pertaining to the object. The current information is identical to the information displayed in the summary information 514 in FIG. 5. However, some fields may have an associated editable field (e.g., edit field 704) allowing the user to enter changes. These changes are then submitted to the web server when update button 702 is selected. One will note that certain fields may not be editable, such as the object name, and CLSID.

Figure 8:
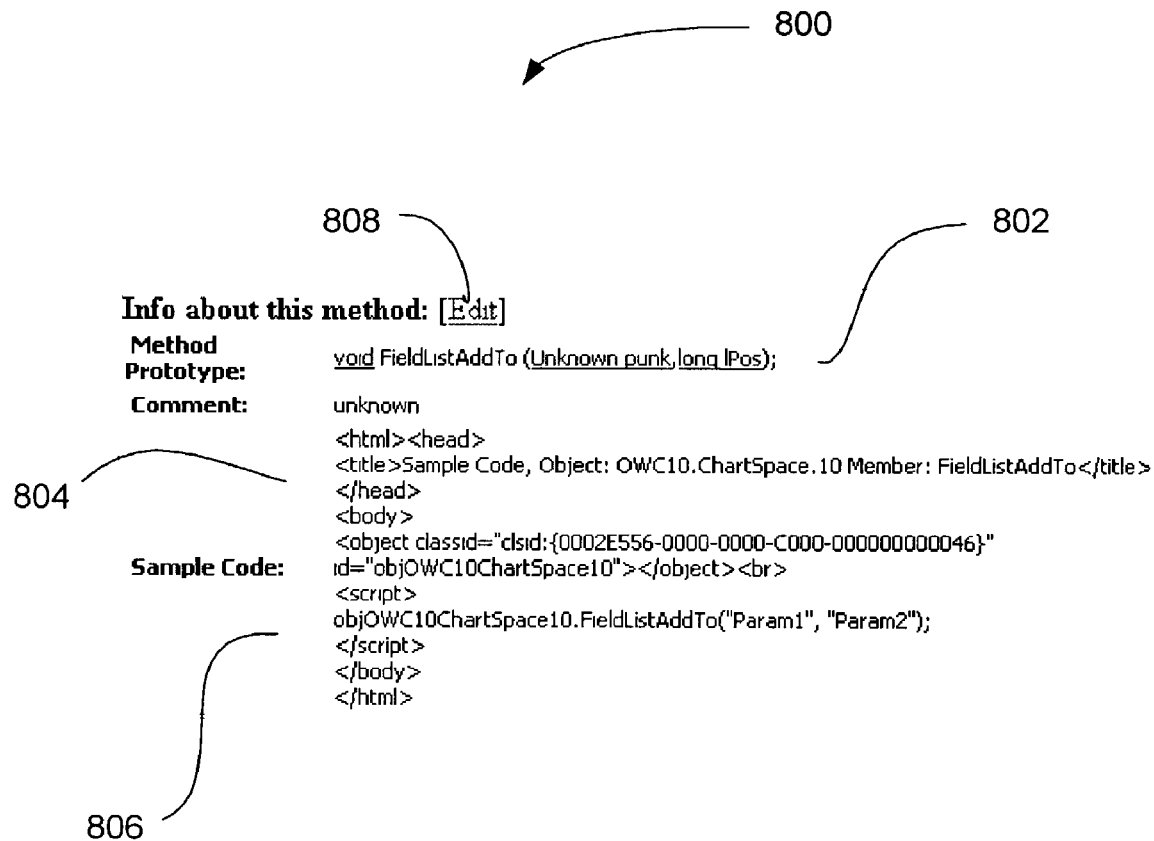

In yet another example, from screen shot 501, the user may obtain additional information about one of the members by selecting the member and clicking more information button 512. FIG. 8 is exemplary screen shot 800 illustrating addition information, such as prototype 802, comments 804, and sample code 806. Again, some of these entries may be easily edited by selecting edit link 808.

Therefore, a tester can clearly and conveniently indicate the review and testing of the object upon each change made to the object. This allows the present invention to track changes, which become invaluable when determining whether a control has been adequately reviewed and tested. In addition, the present invention allows reports to be run on the controls to see which ActiveX controls need to be tested from a security standpoint. In addition, the present invention provides a mechanism for storing pertinent information regarding the controls that will be valuable to future team members of the software development team.

The following discussion describes how this available information is obtained and stored. While the current discussion describes the invention in the context of a software development environment, the invention may also be utilized to obtain information about controls in an off-the-shelf product. Thus, the ActiveX controls in the off-the-shelf product can be identified and reviewed in order to identify potential security risks in controls in that product.

Figure 9:
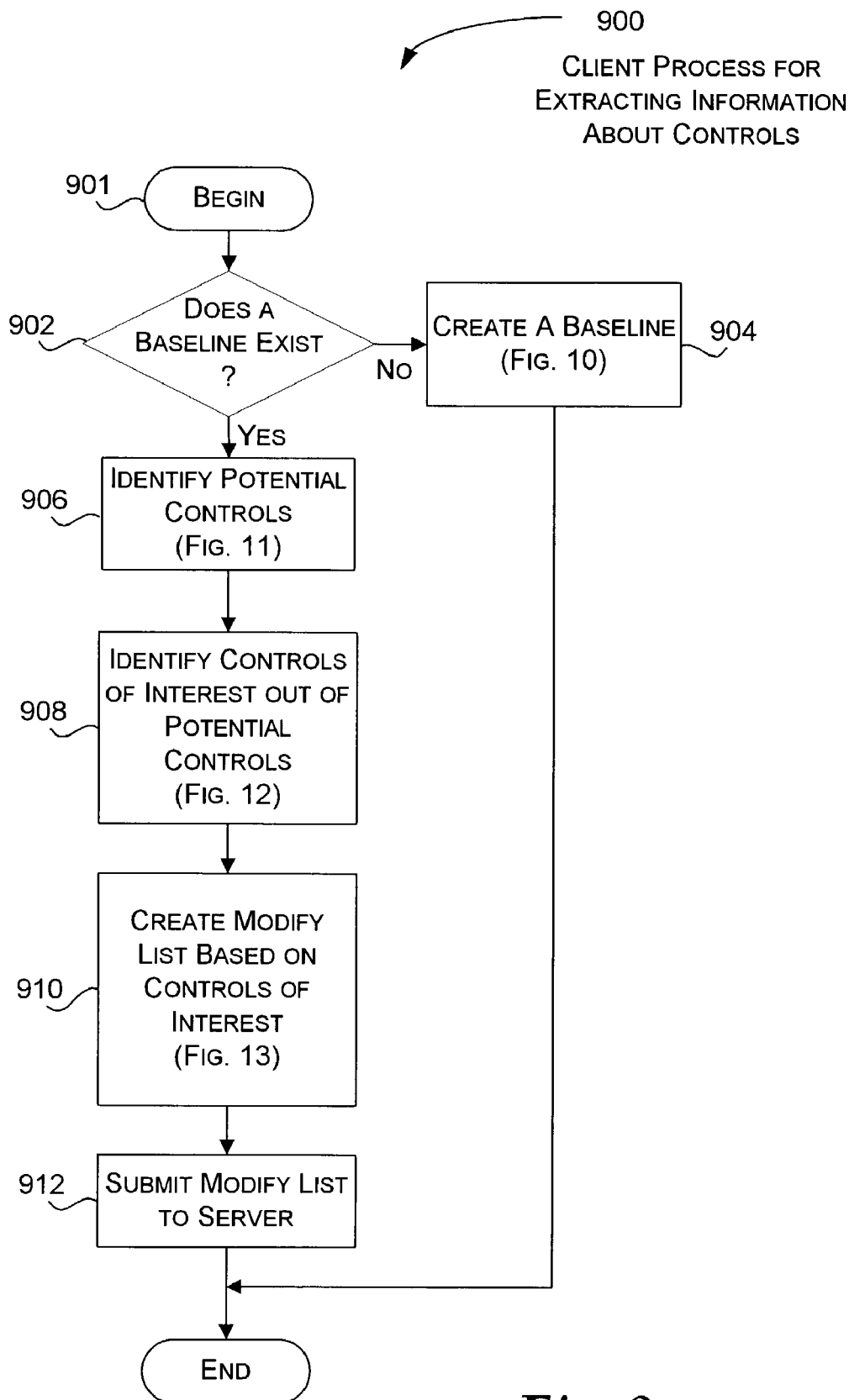
FIG. 9 is a logical flow diagram generally illustrating a process for extracting information about controls that are installed on a computing device.

FIG. 9 is a logical flow diagram generally illustrating a process for extracting information about controls that are installed on a computer. The extraction process 900 begins at block 901, after a build of a software program occurs or when an install of a software application is desired. In one embodiment, the extraction process 900 is triggered by a mechanism, such as a sentinel, when a build process completes. Processing continues at decision block 902.

At decision block 902, a determination is made whether a baseline exists (i.e., baseline 222 shown in FIG. 2). The baseline allows the present invention to be able to track changes to controls that have been installed on a computer. If a baseline does not exist, the process continues at block 904 where a baseline is created. The process for creating a baseline is described below in conjunction with FIG. 10. Once the baseline has been created, the process proceeds to the end block. If a baseline currently exists, processing continues at block 906.

At block 906, the controls are reviewed and classified as potential controls if certain conditions are met. Briefly, information is obtained from objects within a registry, and from files and type libraries associated with the objects obtained from the registry and the file system. This information identifies a set of potential controls. The process for identifying potential controls is described in detail later in conjunction with FIG. 11. Processing continues at block 908.

At block 908, a set of controls of interest is identified from within the potential controls. Briefly, the potential controls are further investigated in order to determine which of the potential controls have been designated as safe or warrant being classified as safe due to the nature of the potential control. The process for identifying the controls of interest is described in detail later in conjunction with FIG. 12. Processing continues at block 910.

At block 910, the controls of interest are further reviewed in order to determine whether the control needs to be updated or added to the database on the web server. The controls that need to be updated or added are identified in a modify list. In general, the modify list identifies new controls and identifies updates to members associated with existing controls. The process for creating the modify list is described in detail later in conjunction with FIG. 13. Processing continues at block 912.

At block 912, the modify list is submitted to the web server for processing. In one embodiment, each of the changes listed in the modify list is sent in a change request at as HTTP POST request to the web server. Because the web server services each request statelessly and independently, the change requests are submitted in a specific order. For example, an object is submitted before members associated with the object are submitted. Once each of the changes listed in the modify list has been sent, processing is complete and proceeds to the end block.

Figure 10:
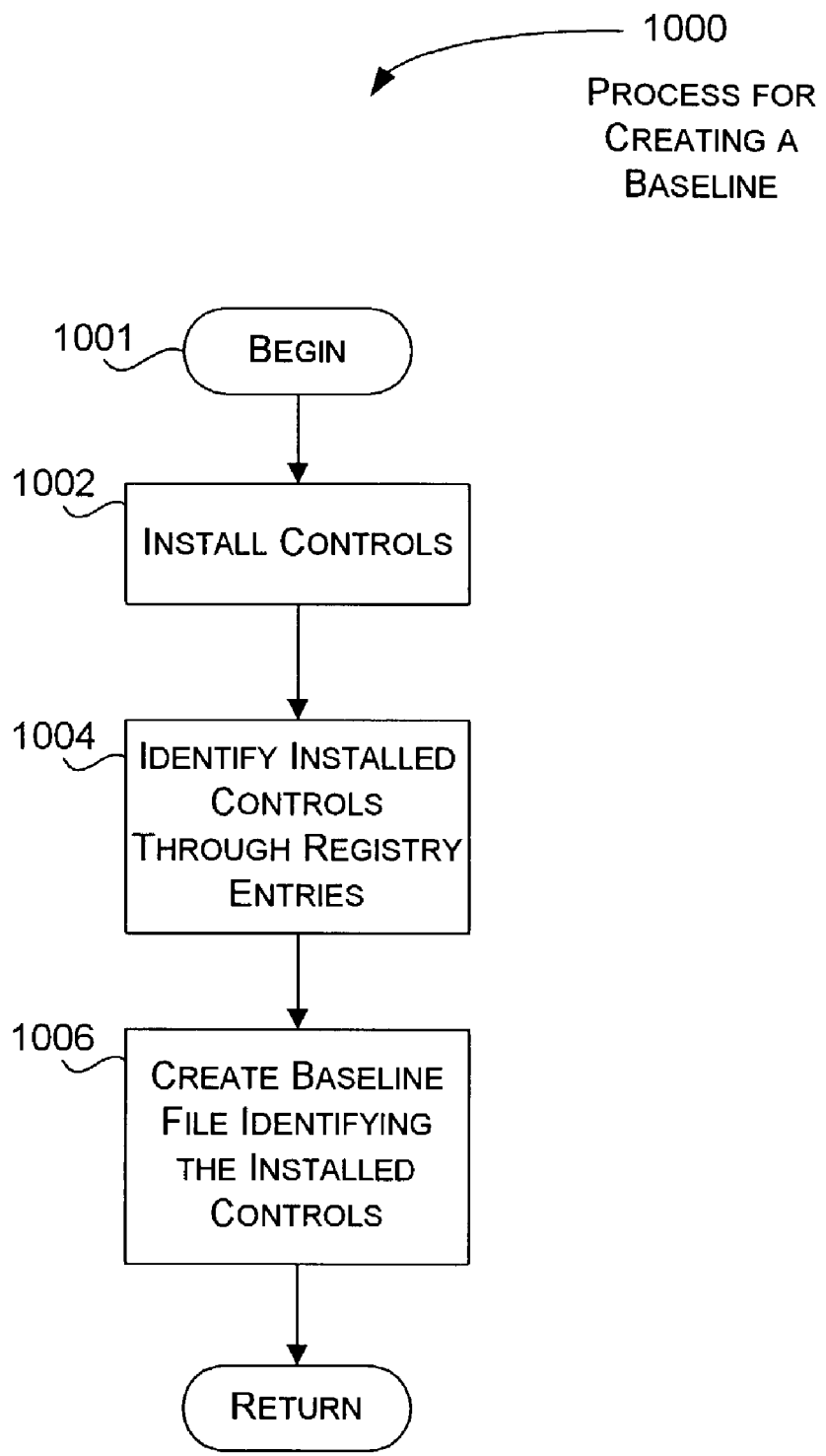
FIG. 10 is a logical flow diagram illustrating an exemplary process for creating a baseline for the controls that is suitable for use in FIG. 9.

FIG. 10 is a logical flow diagram illustrating an exemplary process for creating a baseline for the installed controls on a computer that is suitable for use in FIG. 9. Process 1000 begins at block 1001, after the extraction process has initiated processing and has determined that a baseline file does not exist. The computer on which the baseline is created is a "clean" computer, meaning that the computer does not have any controls installed that need to be tracked in accordance with the present invention. Because controls are used in numerous applications, typically, each application that is installed will have controls associated with it. Therefore, the present invention creates a baseline file that identifies controls that are from other applications, which do not need to be tracked for the current development process. There is an assumption that these other applications will have already performed a security check on their installed controls. Thus, the following discussion pertains to identifying security risks in controls associated with one particular software development project. Processing continues at block 1002.

At block 1002, the controls are installed. As mentioned above, controls are typically installed when installing a software application on the client computer. Therefore, when creating the baseline, applications that are not of interest to the present development application are installed. Processing continues at block 1004.

At block 1004, each control that was installed is identified. In one embodiment, this identification occurs by reviewing entries in a registry. When running in one exemplary operating system, the registry may include a HKEY_CLASSES_ROOT\CLSID key that contains subkeys for each object that is installed. The name of the subkey corresponds to the object's class identifier (CLSID). Therefore, each object currently in the above key does not need to be tracked or reviewed with respect to the application being currently developed. Processing continues at block 1006.

At block 1006, each class identifier is written to a text file (e.g., baseline file 222 shown in FIG. 2). This baseline file will then be used later when identifying whether a control is associated with the application currently being developed (hereinafter referred to as application of interest). Processing then proceeds to return block. Process 1000 may install numerous applications at block 1002.

Figure 11:
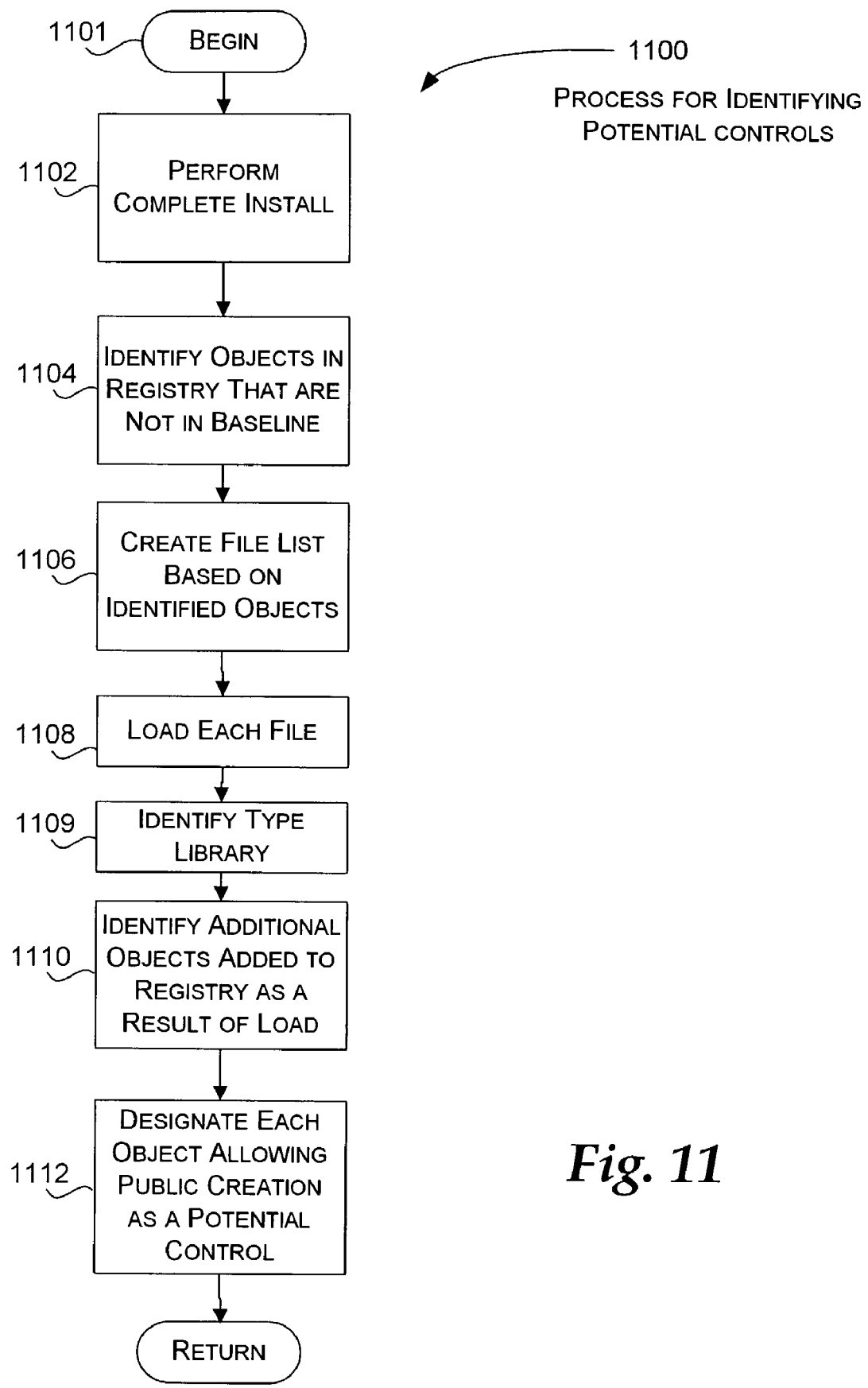
FIG. 11 is a logical flow diagram illustrating an exemplary process for identifying potential controls that is suitable for use in FIG. 9.

FIG. 11 is a logical flow diagram illustrating an exemplary process for identifying potential controls that is suitable for use in FIG. 9. The process 1100 begins at block 1101, after a baseline has been established. Processing continues at block 1102.

At block 1102, a complete install of the application of interest is performed. This install is done so that all the components of the application of interest are installed on one computer (i.e., the client computer 212). For example, typically, an install program allows various configurations to be installed. Because the present invention desires to alert potential security risks in controls, the present invention attempts to force all the components to become installed. Processing continues at block 1104.

At block 1104, objects that have been registered are identified and compared with the baseline. Because the present invention is interested only in the potential security risks created by the application of interest, the object that were previously in the baseline are removed from further investigation. Thus, the remaining objects are designated as identified objects. However, these identified objects unfortunately may not represent all possible controls because some controls may not have registered themselves during the install process. Thus, additional processing is performed in order to identify all possible potential controls. Processing continues at block 1106.

At block 1106, a file list is created based on the identified objects thus far. The file list contains a pathname to an executable file. The executable file typically includes DLL, EXE, OCX, or OCA code for the identified object. As will be appreciated by those skilled in the art, the executable file may have any file extension. This pathname is obtained by looking in the registry for the identified object. Because multiple objects may reference the same file, duplicate pathnames are not added to the file list. Once all the pathnames are obtained for the current identified objects and written to the file list, processing continues at block 1108.

At block 1108, these executable files identified in the file list are loaded. At this point, the present invention is attempting to ferret out all possible controls that may be "hidden" in the program files. Thus, in addition, an in-process server identified for each identified file is called to attempt to force registration of the identified file. In one embodiment, this entails calling an application programming interface, such as DllRegisterServer. Processing continues at block 1109.

At block 1109, each type library associated with the program file is identified. Because multiple type libraries may reference the same control, the process checks to make sure that the control has not been previously processed. The type library for each program file is identified by opening the program file, searching the program file at a specific location based on the executable binary file format of the program file, reading the type library, and parsing the type library that was read. The type library is then available later on when necessary. Processing continues at block 1110

At block 1110, the client computer is again reviewed to determine whether the load performed in block 1108 was successful in registering any "hidden" objects. In one embodiment, each file on the hard disk is review and compared with the files in the baseline file. For any file that is new, the new file is read to determine whether a type library exists, similar to processing performed in block 1109 above. If a type library exists, the type library is reviewed to determine additional objects that can be included in the identified objects for the application of interest. However, duplicate objects are not added to the identified objects. Duplicate objects may occur because multiple file type libraries may reference the same control for cases where the object models inherit interfaces. Identifying duplicate controls may be accomplished by double-checking the registry associated with the control to determine whether the control has already been profiled. Processing continues at block 1112.

At block 1112, each of these identified objects is further reviewed to determine whether the object allows public creation and supports an interface that may be a security risk. Thus, in one embodiment, each identified objects is reviewed to determine whether the IDispatch Interface is supported and whether the identified object has a coclass. In one embodiment, determining whether the IDispatch Interface is supported is accomplished by attempting to instantiate the IDispatch interface for the control itself. The following is exemplary code for instantiating the IDispatch interface for the control:

```
return = CoCreateInstance(
    classID,
    NULL,
    CLSCTX_LOCAL_SERVER | CLSCTX_INPROC_SERVER,
    IID_IDispatch,
    (void **) &pIDispatch
    );.
```

If the IDispatch interface is not supported, "result" will return a specific error code (e.g., E_NOINTERFACE) that designates that the IDispatch interface is not supported. In this case, the object is not included in identified objects associated with the application of interest. However, for most other return values, the present invention errors on the side of caution and presumes that IDispatch interface may be supported. Thus, the object is included in the identified objects. The type library (previously identified above) is then reviewed to determine whether the interface has a coclass or not. If the identified object supports IDispatch and has coclasses for the IDispatch interface, the identified object is designated as a potential control. Thus, the object has met the first set of criteria for determining whether the object is an ActiveX control. The process proceeds to return block.

Figure 12:
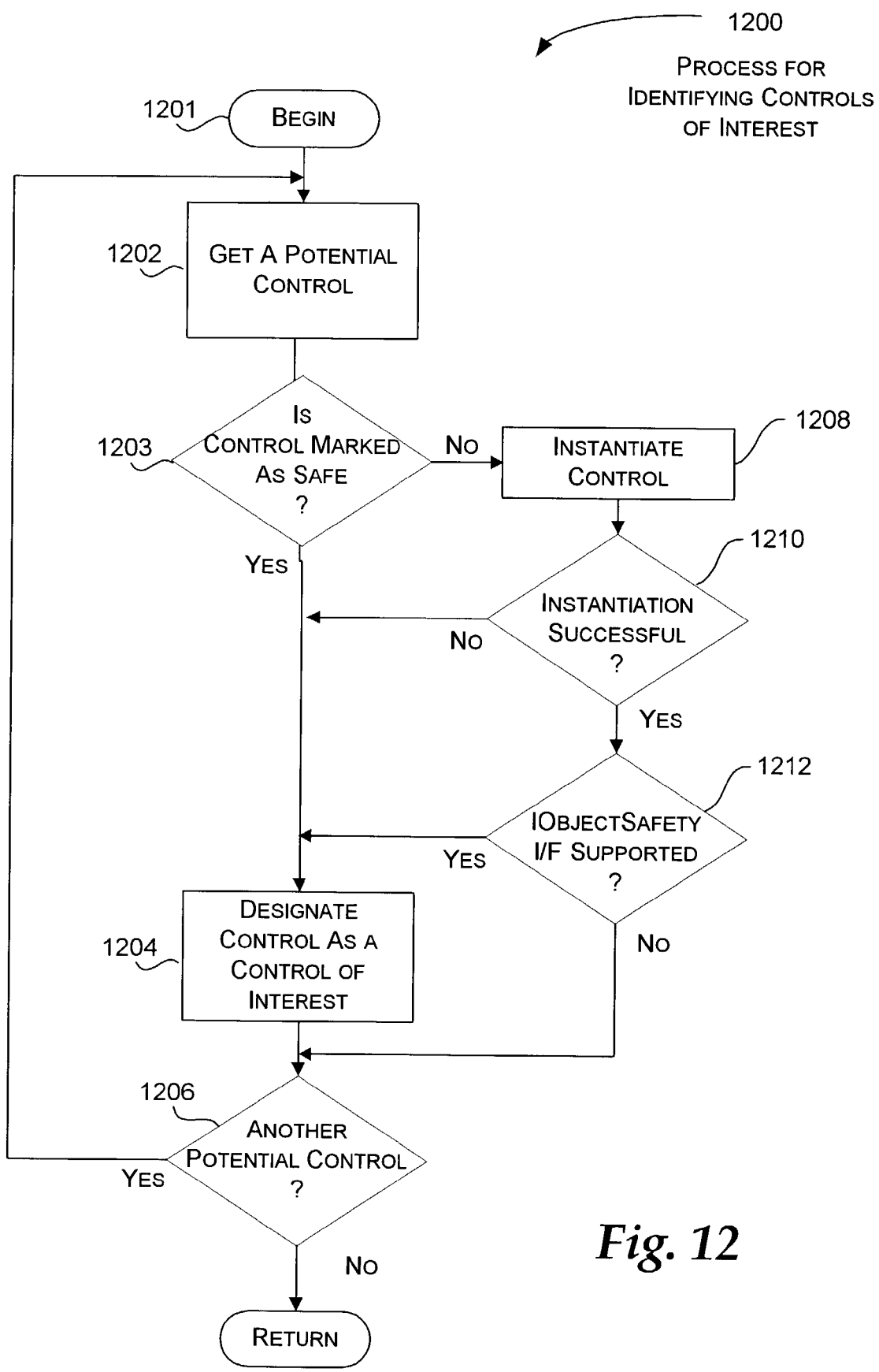
FIG. 12 is a logical flow diagram illustrating an exemplary process for identifying controls of interest that is suitable for use in FIG. 9.

FIG. 12 is a logical flow diagram illustrating an exemplary process for identifying controls of interest suitable for use in FIG. 9. As mentioned above, the potential controls identified in FIG. 11 have passed one set of criteria in determining whether the associated object may be an ActiveX control. Now, these potential controls are further reviewed to determine whether a second criterion is met, namely, whether the object is designated as safe or warrants the designation of safe. Processing begins at block 1201, where the potential controls have already been identified. Processing continues at block 1202.

At block 1202, one of the potential controls is retrieved for further review. Processing continues at decision block 1203. At decision block 1203, a determination is made whether the potential control is marked as safe in the registry. As mentioned above, if the potential control is marked as safe, the web browser application will not warn the user when the potential control is executed. Thus, this potential control is designated as a control of interest in accordance with the present invention (block 1204). Processing continues at decision block 1206.

At decision block 1206, a determination is made whether another potential control needs to be reviewed. Once all potential controls have been reviewed, processing is complete and proceeds to return block. However, while there are still potential controls that need to be reviewed, processing loops back to block 1202 and continues as described above.

Returning to decision block 1203, when the potential control is not marked safe in the registry, processing continues at block 1208. At block 1208, the process attempts to instantiate the potential control. Processing continues at decision block 1210.

At decision block 1210, a determination is made whether the instantiation of the potential control was successful. If the instantiation was unsuccessful, the present invention designates the potential control a control of interest (block 1204). Therefore, the present invention errors on the side of caution when determining which objects to classify as ActiveX controls. If the instantiation was successful, processing continues at decision block 1212.

At decision block 1212, a determination is made whether the instantiated potential control supports an interface related to safety, such as IObjectSafety Interface. If the IObjectSafety Interface is supported, processing continues at block 1204 where the potential control is designated as a control of interest. Otherwise, processing continues to decision block 1206 to determine whether another potential control needs to be reviewed. Because the above discussion focuses on an ActiveX development environment, the controls of interest correspond to ActiveX controls. However, as those skilled in the art will appreciate, in other development environments, the controls of interest may correspond to other types of controls, such as Java applets.

Figure 13:
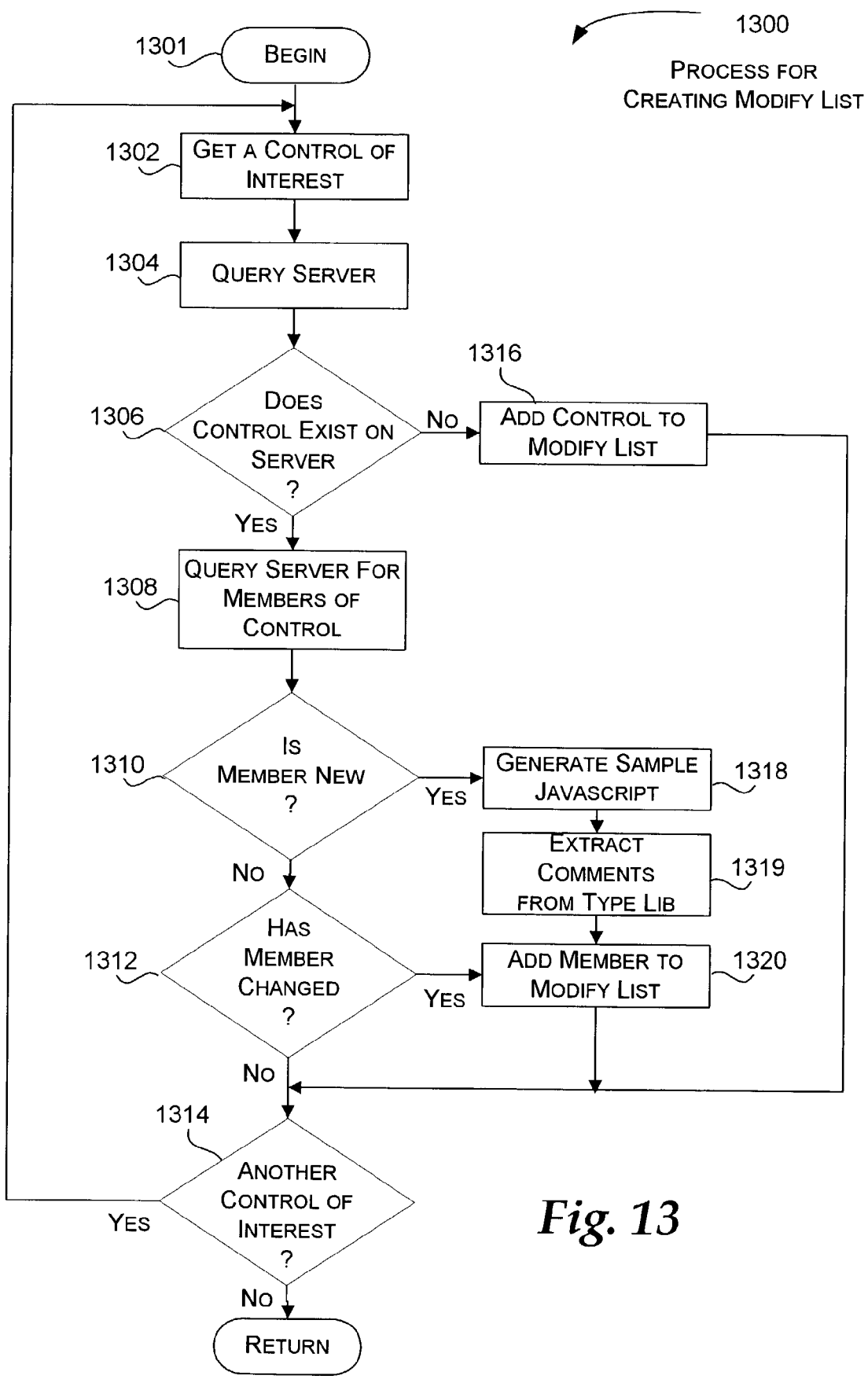
FIG. 13 is a logical flow diagram illustrating an exemplary process for creating a modify list that is suitable for use in FIG. 9.

FIG. 13 is a logical flow diagram illustrating an exemplary process for creating a modify list that is suitable for use in FIG. 9. In general the modify list identifies new controls and changes to existing controls that need to be updated in the database on the web server. The process begins at block 1301, after the controls of interest have been identified. Processing continues at block 1302.

At block 1302, one of the controls of interest is retrieved for processing. Processing continues at block 1304. At block 1304, a query is sent to the web server from the client computer requesting information regarding the retrieved control of interest. The processing performed on the web server will be described in detail in conjunction with FIG. 14. In overview, the web server will send back a reply informing the client computer whether the control of interest currently exists. Processing continues at decision block 1306.

At decision block 1306, a determination is made whether the reply from the web server indicated that information about the control of interest currently exists on the server. If information about the control of interest does not exist on the server, processing continues at block 1316 where the control of interest is added to a modify list. Processing then continues to decision block 1314 where a determination is made whether another control of interest is available for processing. If there is another control of interest, processing loops back to block 1302 where the next control of interest is retrieved. Otherwise, processing is complete and continues to return block.

Returning to decision block 1306, if the control of interest exists on the web server, another query is sent to the server requesting information regarding the members of the control of interest. As mentioned above, the members include methods, properties, parameters, and events associated with the control of interest. Processing continues at decision block 1310.

At decision block 1310, a determination is made whether one or more of the members are new. If there are any new members, processing continues at block 1318 where sample javascript is generated. This sample javascript is later provided to the user when the user requests information regarding this control (see FIG. 8). Processing continues at block 1319, where the type library associated with the control is read so that comments specific to the new member can be extracted. Processing continues at block 1320.

At block 1320, each new member that was identified is added to the modify list. In addition, if comments were available for the new member, these comments may also be added to the modify list. Processing then continues to decision block 1314 to process another control of interest.

Returning to decision block 1310, if a new member was not identified, processing continues to decision block 1312. At decision block 1312, a determination is made whether one or more members have changed. This is achieved by comparing the information returned from the web server with the information available at the client computer obtained after the install. If one ore more members have changed, processing continues to block 1320 where the modified members are added to the modify list.

When no members have changed (decision block 1312), processing continues at decision block 1314 and proceeds as described above. Thus, once the controls of interest have all been processed, the modify list includes information on each new control and each changed control. This information will then be submitted to the web server in order for the web server to update the database.

Figure 14:
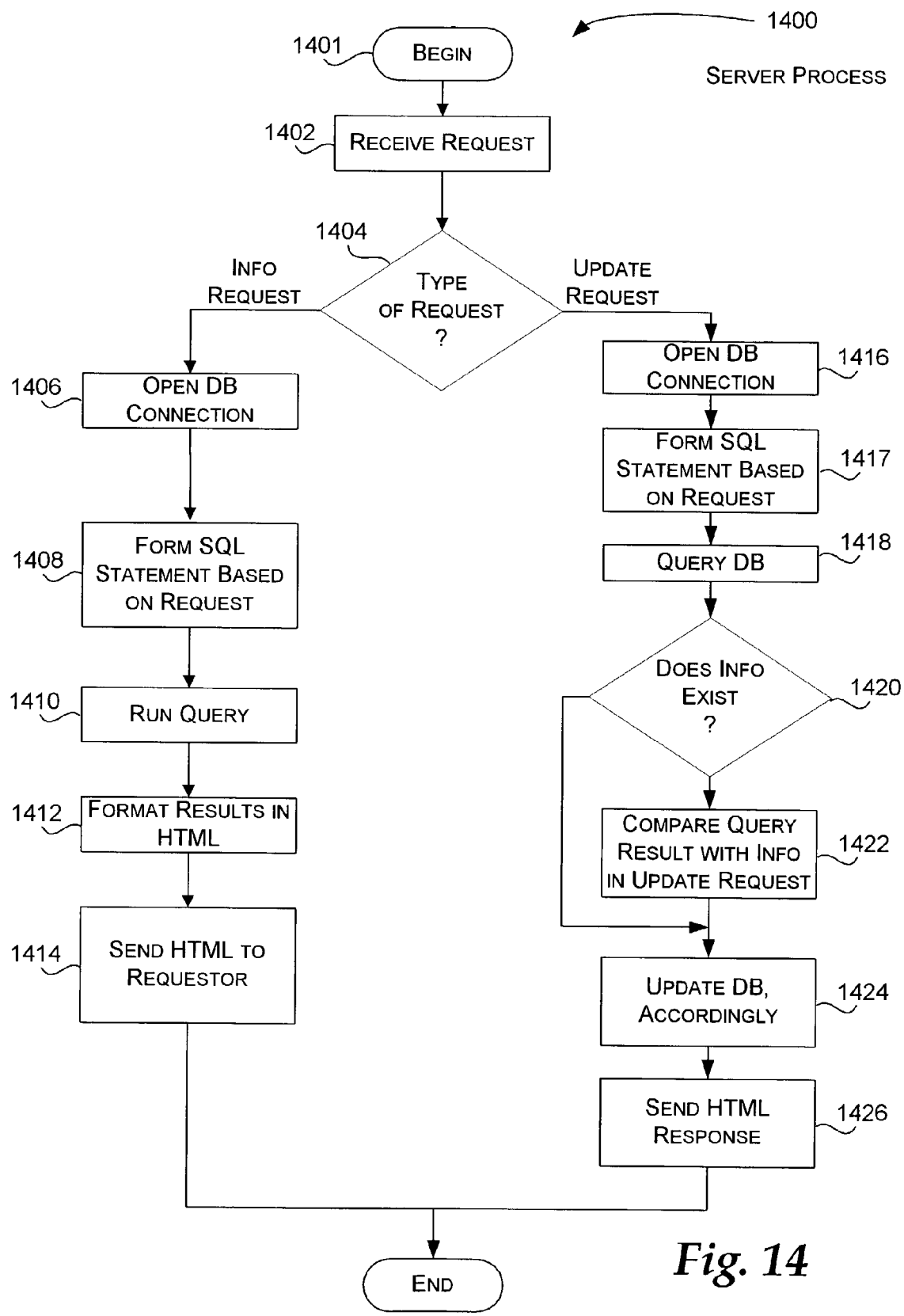
FIG. 14 is a logical flow diagram generally illustrating a server process for handling requests from the user computer and the client computer in FIG. 2.

FIG. 14 is a logical flow diagram generally illustrating a server process 1400 for handling requests from the user computer and the client computer in FIG. 2. The process begins at block 1401, after a request is sent by either the user computer or the client computer. Processing continues at block 1402.

At block 1402, a request is received from either the user computer or the client computer. At decision block 1404, a determination is made regarding the type of request that was received. In general, there are two types of requests, a request for information and a request to update information. In one embodiment, the request for information is sent via an HTTP GET and the request to update is sent via an HTTP POST. When the request is a request for information, processing continues to block 1406.

At block 1406, the web server opens a connection to the database. In one embodiment, the web server communicates with the database using ActiveX Data Objects (ADO). ADO provides a consistent way of accessing the data regardless of the structure of the data. Processing continues at block 1408.

At block 1408, a query is formed based on the request. In one embodiment, the query utilizes a structured query language (SQL) to form the query. The query is then run on the database (block 1410). Results from the query are formatted into an HTML document (block 1412) and sent to the requestor in a manner that the web browser application can easily display. For example, when the requestor is the user computer, FIGS. 3-7 illustrate exemplary displays. Included within the HTML document is javascript that manipulates the user-interface on behalf of the requestor. Processing of the information request is then complete and proceeds to end block.

Returning to decision block 1404, when the request is an update request, processing continues at block 1416. At block 1416, again, the web server opens a connection to the database. Once the connection is opened, processing continues at block 1417. At block 1417, a query is formed. At block 1418, the query is executed to determine whether the information exists. Processing continues to decision block 1420.

At decision block 1420, a determination is made whether the information requested in the update request already exists in the database. If the information exists in the database, processing continues at block 1424.

At block 1424, the database is updated accordingly. For example, if an additional method was added to the control of interest, the database updates the method associated with the control of interest. Processing then optionally continues at block 1426, where an HTML response is sent to the update requestor summarizing the update that was performed. Processing is then complete and proceeds to the end block.

Returning to decision block 1420, when the information does not exist in the database, the process continues at block 1424 so that the database may be updated accordingly.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for tracking and verifying that controls associated with a software program of interest have been tested for security concerns, comprising:

extracting as security risk information, information about controls associated with the interested software program to be installed that are installed on a computer system each time after the interested software program having software objects has been installed or updated on the computer system, the controls being a subset of the software objects; wherein the extraction of information identifies a list of potential controls based on whether the controls present a security risk when executed; wherein the list of potential controls does not include any controls that are associated with a different software program; wherein the security risk information includes information associated with the controls of interest, which are identified as controls that pose a potential security risk; wherein the identification of a list of potential controls is based on includes installing all components of the interested software program, identifying all executable files, and calling each identified executable file to locate controls hidden in all installed components of the interested software program;

identifying controls of interest from the list of potential controls;

storing the security risk information and the identified controls of interest in a database;

retrieving the security risk information upon request;

displaying the security risk information, along with additional information and the identified controls of interest, in a browser, the additional information providing a mechanism for tracking and verifying that the identified controls of interest have been tested for security concerns;

updating the additional information through the browser; and updating the security risk information stored in the database based on the additional information updated through the browser.

2. The computer-implemented method of claim 1, wherein the additional information includes a developer sign-off field that is modifiable to indicate a development status.

3. The computer-implemented method of claim 1, wherein the additional information includes a tester sign-off field that is modifiable to indicate a test status.

4. The computer-implemented method of claim 1, wherein the controls are publicly creatable.

5. The computer-implemented method of claim 1, wherein the controls includes ActiveX controls.

6. A system for tracking and verifying that controls associated with an application of interest have been tested for security concerns, comprising:

a client computer configured to determine a list of controls of interest associated with the interested application to be installed; identify as potential controls, controls that are not associated with another application; identify controls of interest from the potential controls and generate security risk information associated with the controls of interest, the controls of interest being identified from installed software objects and identified at least in part from a determination of whether the controls of interest are safe; wherein the determination of whether the controls of interest are safe depends on whether the controls of interest are a security risk when executed; wherein the generated security risk information includes information associated with the identified controls of interest, which are controls that pose a potential security risk; wherein identification of the potential controls is based on installing all components of the application, identifying all executable files, and calling each identified executable file to locate controls hidden in all installed components of the interested application;

a server computer configured to receive the generated security risk information from the client computer and to store the generated security risk information in a database; and user computers configured to submit requests for security risk information of the interested application to the server computer and in response to the request to receive a rich set of security risk information about the controls that is displayed in a browser executing on the user computer, the rich set of security risk information providing a listing of controls of interest and allowing changes in the controls of interest from the identified controls of interest to be tracked and verified.

7. The system of claim 6, wherein the rich set of security risk information includes a developer sign-off field that is modifiable to indicate a development status.

8. The system of claim 6, wherein the rich set of security risk information includes a tester sign-off field that is modifiable to indicate a test status.

9. The system of claim 6, wherein the server computer is configured to receive the security risk information over Hypertext Transfer Protocol (HTTP).

10. The system of claim 6, wherein requests include information requests and update requests, the information requests being sent via an HTTP GET request to obtain the rich set of security risk information and the update request being sent via an HTTP POST to update the database based on modifications to the rich set of security risk information.

11. The system of claim 6, wherein the client computer is further configured to send a modify request to the server computer indicating a change in the controls and wherein the server computer is further configured to update the database based on the modify request.

12. The system of claim 6, wherein the controls includes ActiveX controls.

13. The system of claim 6, wherein the server computer includes the client computer.

14. A system for tracking and verifying that controls associated with a software program of interest have been tested for security concerns, comprising:
 a client computer that is configured to perform actions, including:
  installing a control that is associated with the interested software program;
  determining whether the control is potentially unsafe based on whether the control presents a security risk when executed;
  extracting as security risk information, information about controls installed on the client computer; wherein the information is extracted each time the interested software program on the client computer are modified; and wherein the information provides a mechanism for tracking changes and verifying testing of the controls; wherein the extraction of security risk information identifies a list of potential controls that does not include any controls that are also associated with a different software program; wherein the security risk information includes information associated with controls of interest and responsive to the determining whether the control is potentially unsafe based on whether the control presents a security risk when executed such that the controls of interest are identified as controls that pose a potential security risk; wherein the identification of a list of potential controls includes installing all components of the interested software program, identifying all executable files, and calling each identified executable file to locate controls hidden in all installed components of the interested software program;
  sending from the client computer the security risk information about the controls of interest; and
 a server that is configured to perform actions, including:
  receiving at the server from the client computer the security risk information about the identified controls of interest;
  storing the security risk information about the identified controls of interest; and
  sending from the server the security risk information to a requesting computer that is configured to display a list of controls of interest from the identified controls of interest.

15. The system of claim 14, wherein determining whether the control is potentially unsafe comprises determining whether the control includes an interface that may be the security risk.

16. The system of claim 15, wherein the client computer is further configured to attempt to instantiate the control.

17. The system of claim 16, wherein determining whether the control is potentially unsafe comprises determining whether the control includes a safety interface.

* * * * *